United States Patent
Cao et al.

(10) Patent No.: US 10,539,728 B2
(45) Date of Patent: Jan. 21, 2020

(54) DISPLAY PANEL, POLARIZER, COLOR FILM SUBSTRATE AND DISPLAY APPARATUS FOR CONDUCTING ELECTROSTATIC CHARGES

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Chengying Cao, Beijing (CN); Peng Li, Beijing (CN); Xiong Xiong, Beijing (CN); Jideng Zhou, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 167 days.

(21) Appl. No.: 15/744,991

(22) PCT Filed: Aug. 4, 2017

(86) PCT No.: PCT/CN2017/096011
§ 371 (c)(1),
(2) Date: Jan. 15, 2018

(87) PCT Pub. No.: WO2018/126674
PCT Pub. Date: Jul. 12, 2018

(65) Prior Publication Data
US 2019/0011619 A1   Jan. 10, 2019

(30) Foreign Application Priority Data

Jan. 5, 2017 (CN) .......................... 2017 1 0008053

(51) Int. Cl.
*G02B 5/30* (2006.01)
*G02B 5/20* (2006.01)
(Continued)

(52) U.S. Cl.
CPC ........... *G02B 5/3041* (2013.01); *G02B 5/201* (2013.01); *G02B 5/3033* (2013.01);
(Continued)

(58) Field of Classification Search
CPC .......... G02B 1/08; G02B 1/115; G02B 1/116; G02B 5/30; G02B 5/3025; G02B 5/3033;
(Continued)

(56) References Cited

U.S. PATENT DOCUMENTS 6,853,492 B1    2/2005  Lau et al.
9,841,647 B2 *  12/2017 Guo .................. G02F 1/133514
(Continued)

FOREIGN PATENT DOCUMENTS

CN    102262313 A    11/2011
CN    202067055 U    12/2011
(Continued)

OTHER PUBLICATIONS

International Search Report & Written Opinion dated Nov. 2, 2017, regarding PCT/CN2017/096011.

*Primary Examiner* — Arnel C Lavarias
(74) *Attorney, Agent, or Firm* — Intellectual Valley Law, P.C.

(57) ABSTRACT

A polarizer, a polarizer, a color film substrate, a display panel, and a method of conducting away electrostatic charges are disclosed. The polarizer includes a transparent conductive film layer where the transparent conductive film layer is added with a conductive material, and when the polarizer comprising the transparent conductive film layer connects to a ground, the conductive material that is added (Continued)

to the transparent conductive film layer enables the polarizer to conduct electrostatic charges away from the polarizer to the ground.

19 Claims, 5 Drawing Sheets

(51) Int. Cl.
    *G02F 1/1335*     (2006.01)
    *G06F 3/044*     (2006.01)

(52) U.S. Cl.
    CPC ..... *G02B 5/3058* (2013.01); *G02F 1/133528* (2013.01); *G02F 2202/22* (2013.01); *G06F 3/044* (2013.01)

(58) Field of Classification Search
    CPC .... G02B 5/3041; G02B 5/3058; G02B 27/28; G02B 27/486; G02F 1/133528; G02F 2202/22; G06F 3/044

USPC ............ 359/485.01, 485.03, 483.01, 489.01, 359/489.07, 489.15, 489.2, 490.01, 359/491.01; 362/19; 353/20

See application file for complete search history.

(56) References Cited

U.S. PATENT DOCUMENTS

| | | | |
|---|---|---|---|
| 2015/0253468 A1* | 9/2015 | Zuo .................. | G02F 1/133528 |
| | | | 349/96 |
| 2017/0131804 A1 | 5/2017 | Sata | |

FOREIGN PATENT DOCUMENTS

| | | |
|---|---|---|
| CN | 202159156 U | 3/2012 |
| CN | 102981322 A | 3/2013 |
| CN | 104635292 A | 5/2015 |
| WO | 2016009915 A1 | 1/2016 |

* cited by examiner

DISPLAY PANEL, POLARIZER, COLOR FILM SUBSTRATE AND DISPLAY APPARATUS FOR CONDUCTING ELECTROSTATIC CHARGES

CROSS-REFERENCE TO RELATED APPLICATION

This patent application is a national stage application under 35 U.S.C. § 371 of International Application No. PCT/CN2017/096011, filed Aug. 4, 2017, which claims the priority of the Chinese Patent Application No. 201710008053.1 filed on Jan. 5, 2017, the entire contents of which are hereby incorporated by reference herein in its entirety.

TECHNICAL FIELD

The present disclosure relates to the display technology, and in particular to a display panel, a polarizer, a color film substrate and a display apparatus for conducting electrostatic charges.

BACKGROUND

For Advanced Super Dimension Switch (ADS) product, electrostatic charges may be accumulated on the surface of the Thin Film Transistor-Liquid Crystal Display (TFT-LCD) panel. The charges may affect the internal electric field of the panel, and affect the display effect of the product. The electrostatic charges may cause a series of defects such as picture greening and Gate on Array (GOA) area breakdown, thus may seriously affect the quality of the product.

SUMMARY

In embodiments of the present disclosure, a display panel, a polarizer, a color film substrate and a display apparatus are provided for conducting electrostatic charges away from the color film substrate.

In the present disclosure, a display panel is provide. The display panel may include a first substrate including a ground in a periphery of the first substrate; a counter substrate opposite to the first substrate; a sealer between the first substrate and counter substrate defining an inside region; a polarizer on a side of the counter substrate distal to the first substrate; where: the ground is on a side of the sealer; the polarizer is a multi-layer; at least one of the multi-layer is a transparent conductive film layer; and at least one of the transparent conductive film layer extends along a surface of the sealer proximate to the ground to connect and contact to the ground which enables the transparent conductive film layer to conduct electrostatic charges away from display panel to the ground.

Optionally, the transparent conductive film layer is added with a conductive material comprising a graphene material.

Optionally, all layers in the multi-layer of the polarizer extends along the surface of the sealer proximate to the ground.

Optionally, the graphene material is distributed in the whole polarizer.

Optionally, the graphene material is distributed in a portion of the polarizer extending along the surface of the sealer proximate to the ground.

Optionally, the at least one of the multi-layer of the polarizer is added with a graphene material.

Optionally, the polarizer may include: a body comprising a portion of the polarizer covering the surface of the counter substrate distal to the first substrate; and a branch integrated connected to the body, the branch including a portion of the polarizer extending along the surface of the sealer proximate to the ground.

Optionally, the branch is of a foldable structure, the foldable structure capable of removing from a location on the side of the counter substrate distal to the first substrate to a location on the surface of the sealer proximate to the ground.

Optionally, the body and the branch form a substantially L shape.

Optionally, the counter substrate is free of a separate Indium tin oxide (ITO) layer for conducting electrostatic charges away from display panel to the ground.

In the present disclosure, a polarizer is provided. The polarizer in a display panel including a first substrate comprising a ground in a periphery of the first substrate, a counter substrate opposite to the first substrate and a sealer between the first substrate and counter substrate may include at least one transparent conductive film layer extending along a surface of the sealer proximate to the ground to connect and contact to the ground which enables the transparent conductive film layer to conduct electrostatic charges away from display panel to the ground.

Optionally, the transparent conductive film layer is added with a conductive material comprising a graphene material.

Optionally, the graphene material is distributed in the whole polarizer.

Optionally, the graphene material is distributed in a portion of the polarizer extending along the surface of the sealer proximate to the ground.

Optionally, the polarizer may further include a body comprising a portion of the polarizer covering the surface of the counter substrate distal to the first substrate; and a branch connected to the body, the branch comprising a portion of the polarizer extending along the surface of the sealer proximate to the ground.

Optionally, the branch is of a foldable structure, the foldable structure capable of removing from a location on the side of the counter substrate distal to the first substrate to a location on the surface of the sealer proximate to the ground.

Optionally, the body and the branch form a substantially L shape.

In the present disclosure, a color film substrate is provided. The color film substrate may include the polarizer according to the present disclosure herein.

In the present disclosure, a display apparatus is provided. The display device may include the display panel provided in the present disclosure herein.

It is to be understood that both the forgoing general description and the following detailed description are exemplary only, and are not restrictive of the present disclosure.

BRIEF DESCRIPTION OF THE DRAWINGS

In order to more clearly illustrate the technical solutions in the embodiments of the present disclosure, drawings needing to be used in descriptions of the embodiments will be simply introduced. The drawings described below are only some embodiments of the present disclosure. Without creative work, a person of ordinary skill in the art may also obtain other drawings according to these drawings.

Figure 1:
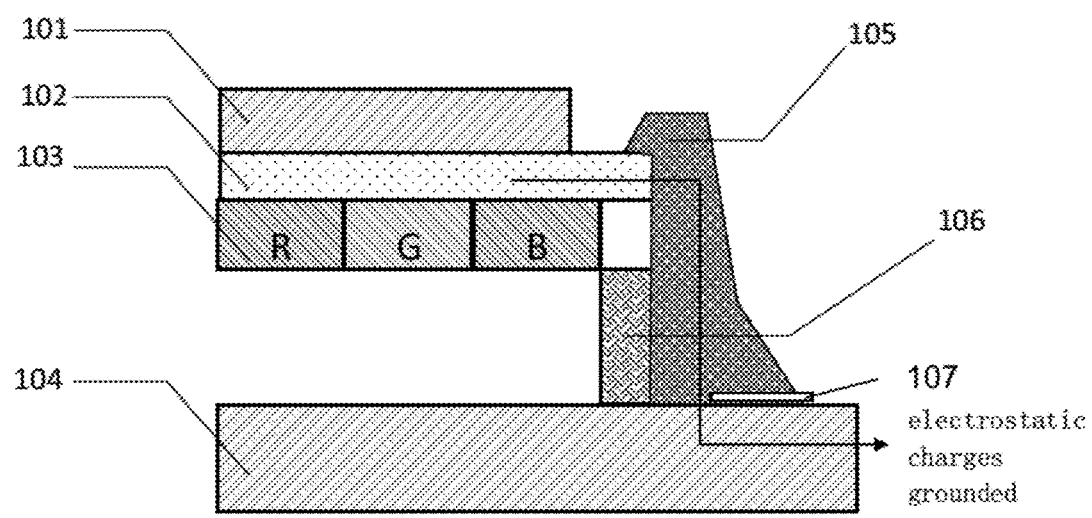
FIG. 1 shows an example of a structural diagram of a display panel.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various examples of the present disclosure. Also, common but well-understood elements that are useful or necessary in a commercially feasible example are often not depicted in order to facilitate a less obstructed view of these various examples. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein

DETAILED DESCRIPTION

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an example is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

FIG. 1 shows an example of a structural diagram of a display panel. In order to solve the problem caused by electrostatic charges, as shown in FIG. 1, for Advanced Super Dimension Switch (ADS) and High Transmittance-ADS (HADS) products, a conductive layer such as Back Indium tin oxide (ITO) 102 may be formed at the back of a color film 103. The forming method may be coating, sputtering, ink printing. The back ITO 102 may serve as an anti-static electricity conductive layer in a color filter substrate. Further, a silver colloid 105 may be coated at periphery of a frame sealing adhesive 106 at a junction between the color film substrate and an array substrate in a product forming a module.

When the charges are accumulated on the surface of the color film substrate, the charges may be conducted to a ground (GND) of a Flexible Printed Circuit (FPC) 107 in a TFT substrate 104 through the coated back ITO 102. Thus, electrostatic charges on the color film substrate can be grounded, and various display problems caused by conduction of the electrostatic charges into the panel can be solved.

Figure 2:
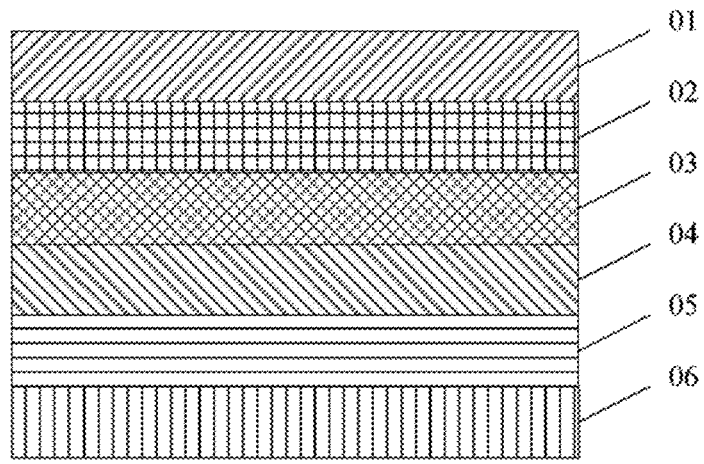
FIG. 2 illustrates a structural diagram of a polarizer.

A polarizer 101 is shown in FIG. 1 according to the above solution. A common polarizer structure is shown in FIG. 2. In FIG. 2, the polarizer, sequentially from the top, includes the following film layers: a protective film 01, a Cellulose Triacetate film (TAC) 02, a Polyvinyl Alcohol film (PVA) 03, a compensation film 04, a Pressure-Sensitive Adhesive film (PSA) 05 and a release film 06. The main functions of the protective film 01 may be low-peel static electricity prevention and pollution resistance. The TAC layer 02 may achieve different surface treatment effects, including common atomizing and high transmittance effects, and the PVA layer 03 may determine the characteristics of light. The compensation film 04 may be used for compensating different display modes. The PSA layer 05 may be intended to solve the problem of light leakage of the polarizer, and the release film 06 may be used for providing the polarizer with low peel performance.

To sum up, a common design for preventing ESD of a color film side may be to resist against ESD according to a principle that the Back ITO of the color film side is conducted to a GND wire of a TFT side through a silver colloid dispensing design.

However, the solution provided above may add a process of dispensing the silver colloid to the module. The problems of abnormality of the silver colloid may exist in a coating process. Also, oxidation of the silver colloid, breakage and permeation into the panel may occur. The Back ITO may reduce the display effect of a product, or may even seriously affect the quality of the product. Moreover, for a Touch product such as a touch screen product, when there is a Back ITO on the color film substrate, a process of removing the Back ITO may be needed during subsequent lamination of the Touch product. On the other hand, if the Back ITO is not added to the color film side, the anti-ESD capability of a subsequent product may be reduced.

In the embodiments of the present disclosure, a polarizer, a color film substrate, a display panel, and a display device are provided for conducting electrostatic charges away from the color film substrate through the polarizer. In this design, a conductive layer arranged on the color film substrate may not be needed, and a process of removing an ITO is eliminated. Because the removal of the ITO is not needed during subsequent lamination of a Touch product, the quality of the product is improved.

In the embodiment of the present disclosure, one or more transparent conductive film layers may be added to the polarizer. For example, one or more graphene layers, or other transparent conductive materials, may be added to the polarizer. In practice, graphene may be added to any layer in the polarizer. Because the added conductive film layers may conduct the electrostatic charges away from the conductive film layers, the Back ITO is not needed. As the need for the Back ITO is eliminated, the process of removing the Back ITO is not needed during subsequent lamination of a Touch product.

The transparent conductive film layer may be used to achieve an anti-static electricity effect of the color film (CF) substrate. For example, by extending one end of a layer having the graphene material on the polarizer or one end of the whole polarizer to a GND of a TFT substrate, the electrostatic charges of a CF substrate may be conducted away. As such, the transparent conductive film layer may effectively resolves the issues caused by the accumulation of electrostatic charges on a CF substrate.

According to one example provided in the present disclosure, it may not be needed to coat the Back ITO on a HADS product color film substrate for static electricity conduction. By adding one or more transparent conductive film layers, the CF substrate may provide a basis for subsequent lamination of a Touch product, and may continuously have an anti-static electricity function. Moreover, the added transparent conductive film layer may eliminate the need for a procedure of connecting a GND by coating silver colloid at a subsequent stage of a module. Therefore, the breakage, residue and the like of the silver colloid may not occur.

Figure 3:
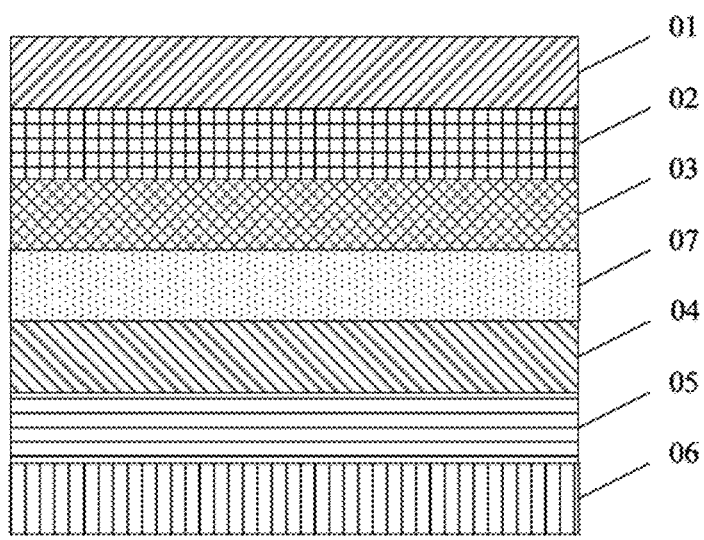
FIG. 3 shows an example of a structural diagram of a polarizer according to an embodiment of the present disclosure.

For example, as shown in FIG. 3, the polarizer is added with transparent conductive graphene. Specifically, a graphene layer may be independently formed in the polarizer. As shown in FIG. 3, a graphene layer 07 is arranged between the PVA 03 and the compensation film 04. However, the graphene layer 07 may not be limited to be arranged between the PVA film 03 and the compensation film 04. In some embodiments, the graphene layer may be arranged between any two existing layers of the polarizer. Furthermore, multiple graphene layers 07 may be arranged with the polarizer.

Alternatively or additionally, the graphene material may be added to any one or more of the following layers: a protective film 01, a TAC 02, the PVA film 03, the compensation film 04, a PSA 05 and a release film 06. After adding the graphene material into one or more layers, the polarizer may have the static electricity conduction function, and may be able to conduct electrostatic charges away. Thus, the ITO at the color film side may not be needed.

In practice, the transparent conductive film layer may be one or a combination of the following film layers: a TAC 02, a PVA 03, a compensation film 04 and a PSA 05. The graphene may be doped in the protective film, the TAC 02, the PVA 03, the compensation film 04, the PSA 05 and other film layers. The polarizer may have a function of conducting electrostatic charges away when one or a combination of the above file layers becomes the transparent conductive film layer.

In general, the graphene has a perfect two-dimensional crystal structure, and one lattice thereof is a hexagon formed by six carbon atoms, and the thickness is about an atom layer. The graphene is a new-generation transparent conductive material. In the visible light bands, the transmittance of four layers of graphene is equal to that of an ITO thin film. At non-visible light bands, the transmittance of the four layers of graphene is much higher than that of the ITO thin film. The graphene is the thinnest and hardest known nanometer material which is almost completely transparent and absorbs about 2.3% of light. The amount of graphene to be applied to the transparent conductive film layer may be 0.5% of materials to be used for the transparent conductive film layer. Such amount may achieve the good conductive result and does not absorb much of light that passes through the layer.

The heat conduction coefficient of the graphene is up to 5300 W/m·K which is higher than those of a carbon nano tube and a diamond. At a normal temperature, the electronic mobility of the graphene exceeds 15000 cm2/V·s which is higher than that of the carbon nano tube or a silicon crystal. The resistivity of the graphene is about 10–6Ω·cm which is lower than that of copper or silver. The graphene is a material having the lowest resistivity around the world. Due to extremely low resistivity and extremely high electronic mobility, the graphene is expected to be used for developing a thinner new-generation electronic element or transistor having a higher conduction velocity. The graphene is actually a transparent and good conductor, and may be suitable for manufacturing a transparent touch screen, a light panel or even a solar cell.

Figure 4:
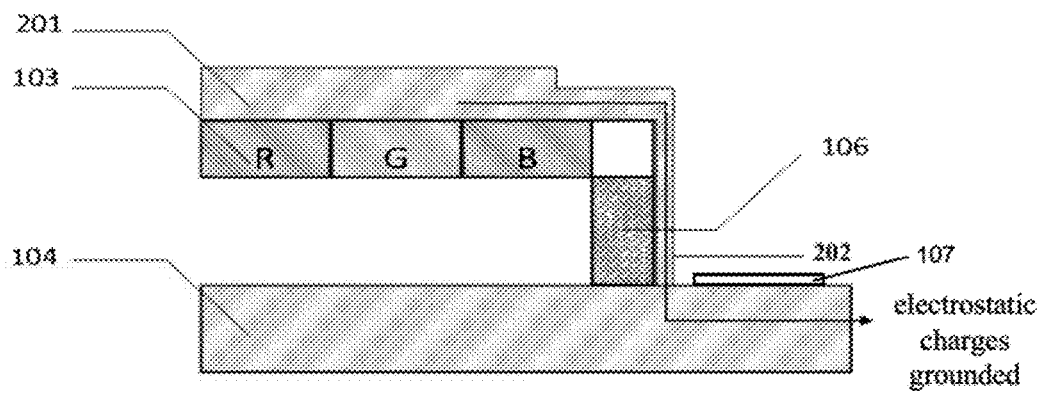
FIG. 4 illustrates a structural diagram of a display panel according to an embodiment of the present disclosure.

In one embodiment of the present disclosure, the transparent conductive graphene may be doped into an existing polarizer structure to replace an ITO film. Then, the soft polarizer may be made to be a polarizer 201 having a foldable structure as shown in FIG. 4 by using a polarizer manufacturing and cutting technology. As shown in FIG. 4, the display panel comprises a first substrate and a counter substrate opposite to the first substrate. The first substrate may be a TFT substrate, and the counter substrate may be a color film substrate with a color film 103. The display panel further may include a sealer between the first substrate and counter substrate defining an inside region. The sealer may be a frame sealing adhesive 106. Optionally, the display panel further comprises a polarizer 201 on a side of the counter substrate distal to the first substrate. Optionally, the first substrate comprises a ground in a periphery of the first substrate. The ground is on a side of the sealer. The ground may be a GND metal wire, such as FPC GND 107.

Optionally, the polarizer is a multi-layer. Optionally, at least one of the multi-layer is a transparent conductive film layer; and at least one of the multi-layer is a transparent conductive film layer, and at least one of the transparent conductive film layer extends along a surface of the sealer proximate to the ground to connect and contact to the ground which enables the transparent conductive film layer to conduct electrostatic charges away from display panel to the ground. Optionally, the transparent conductive film layer may be added with a conductive material having a graphene material.

Optionally, a body having a portion of the polarizer 201 may cover the surface of the counter substrate that may be distal to a first substrate; and a branch integrated may be connected to the body, and the branch having a portion of the polarizer may extend along the surface of the frame sealing adhesive 106 proximate to the FPC GND 107.

As shown in FIG. 4, a part 202 of the polarizer 201 is directly overturned or bended to be lapped to or touch a FPC GND 107 metal wire of a TFT side. Thus, electrostatic charges generated in the polarizer may be conducted to the GND 107. In FIG. 4, all layers in the multi-layer of the polarizer 201 may extend along the surface of the frame sealing adhesive 106 proximate to the FPC GND 107. Also, as shown in FIG. 4, an arrowed line represents a route in which conducting electrostatic charges away to the GND 107.

The graphene material may be distributed in the whole polarizer 201. The graphene materials may be uniformly distributed in the whole polarizer or may be distributed at the part of the polarizer. The graphene materials may be distributed unevenly in the whole or part of the polarizer. The graphene materials may at least be distributed at a part lapped to the GND of the TFT side for conducting the electrostatic charges away to the GND 104. Thus, the graphene material may be distributed in a portion of the polarizer 201 that extends along the surface of the frame sealing adhesive 106 proximate to the FPC GND 107.

When the graphene materials are distributed in the whole polarizer, after the polarizer is laid on the color film, the electrostatic charges of the whole color film may be conducted away to the FPC GND 107. When the graphene materials are distributed in a part of polarizer, the part of the polarizer that are distributed with graphene materials may be identified as one or more areas of the color film that may accumulate electrostatic charges easily. When the one or more areas of the color film can be identified that may accumulate electrostatic charges, the graphene materials may not be distributed to the whole polarizer. Even so, at least one of the multi-layer of the polarizer 201 is added with a graphene material.

The conductivity of transparent conductive graphene is higher than the ITO and the resistance of it is smaller than the ITO. The graphene applied polarizer provides a convenient conductive channel for conducting away the electrostatic charges accumulated one the color film layer. Thus, when a large current formed by electrostatic charges exists, the current may be conducted away through the polarizer preferentially. Such implementation may avoid an attack of the electrostatic charges to metal wires within the screen, which may avoid the burn-down of the metal wires and the serious picture display abnormality. Thus, it is possible that the counter substrate is free of a separate Indium tin oxide (ITO) layer for conducting electrostatic charges away from display panel to the GND.

In an embodiment of the present disclosure, one or more graphene layers may be arranged in the polarizer, or the polarizer may be added with a graphene material. For example, the graphene may be doped in a protective film, a TAC, a PVA, a compensation film, a PSA and other film layers.

Figure 5:
FIG. 5 shows another example of a structural diagram of a polarizer according to an embodiment of the present disclosure.

The polarizer may be made to be of a structure as shown in FIG. 4. When in a section view that the polarizer is in a direction vertical to the surface of the polarizer as shown in FIG. 5, the polarizer may include a body 201 and a branch 202. After the polarizer is arranged and applied on the color film 103, the branch 202 may be lifted and may be overturned. When the branch 202 is lifted and overturned, the branch 202 may be connected to a GND of an FPC along the periphery of the frame sealing adhesive 106 to form the structure as shown in FIG. 4. As such, the electrostatic charges accumulated in the color film layer may be conducted away to the GND 104.

The transparent conductive film layer may be at least distributed on the branch 202 to conduct the electrostatic charges away. Preferably, the transparent conductive film layer may be distributed on the body 201, such that after the polarizer is laid on a color film, the electrostatic charges of the whole color film may be conducted away.

The branch 202 may be a foldable structure. The foldable structure may be capable of removing from a location on the side of the counter substrate distal to the first substrate to a location on the surface of the frame sealing adhesive 106 proximate to the FPC GND 107. For example, the branch 202 of the polarizer may be directly overturned and lapped to a GND of a TFT side. By this way, an electrostatic charge conduction effect may be achieved and operations of the conducting the electrostatic charges may be facilitated. If the branch 202 is made to be L-shaped, the branch 202 may be directly lapped to the GND of the TFT side without being overturned, thus the electrostatic charge conduction effect can be easily achieved. The body of the polarizer and the branch may form a substantially L shape.

Figure 6:
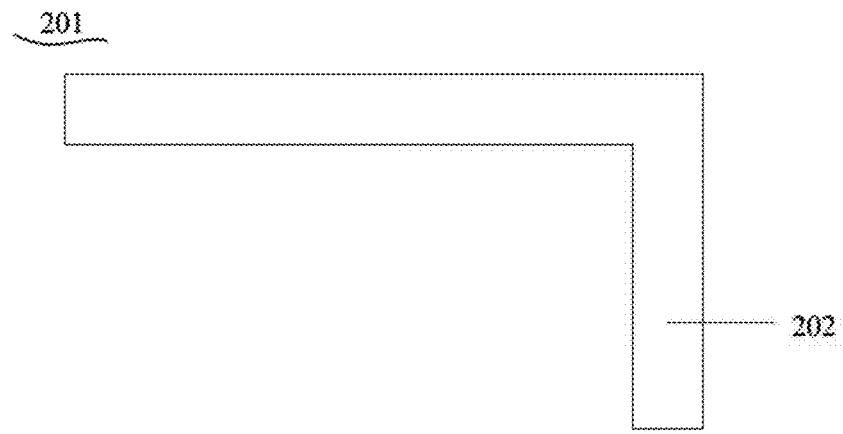
FIG. 6 shows another example of a structural diagram of a polarizer according to an embodiment of the present disclosure.

The polarizer may be directly formed to be of a structure as shown in FIG. 6. In FIG. 6, the polarizer may be need to be overturned. The polarizer as shown in FIG. 6 may include a body 201 and a branch 202, the body 201 may be arranged on top of the color film 103, and the branch 202 may be connected to a GND of an FPC along the periphery of the frame sealing adhesive 106. The electrostatic charges generated may thus be conducted away to the GND 104.

In one embodiment of the present disclosure, a color film substrate may be provided. The color file may include the polarizer according to the above description. The polarizer may include transparent conductive film layer. The transparent conductive film layer may be added with a conductive material. When the polarizer having the transparent conductive film layer connects to a GND, the conductive material that is added to the transparent conductive film layer enables the polarizer to conduct electrostatic charges away from the polarizer to the GND.

Optionally, in an embodiment of the present disclosure, the color film substrate may further include a glass substrate and a color film layer located on top of the glass substrate. The polarizer may located on top of the color film layer.

Figure 7:
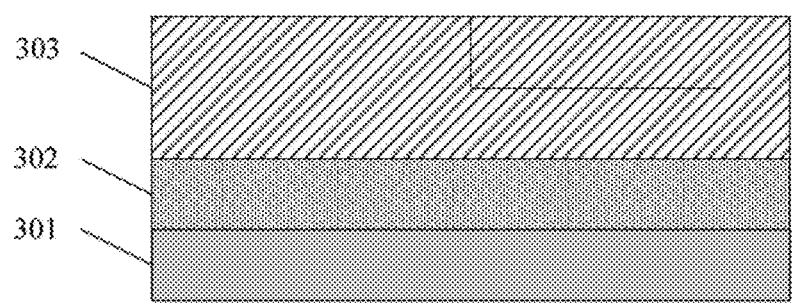
FIG. 7 illustrates a structural diagram of a color film substrate according to an embodiment of the present disclosure.

As shown in FIG. 7, according to the color film substrate provided in the embodiment of the present disclosure, a color film layer 302 may be arranged or positioned on a glass substrate 301, and a polarizer 303 may be arranged on the color film layer 302.

The color film layer 302 may be a Red-Green-Blue (RGB) color film layer, or may be a color film layer formed by resin materials of other colors.

Figure 8:
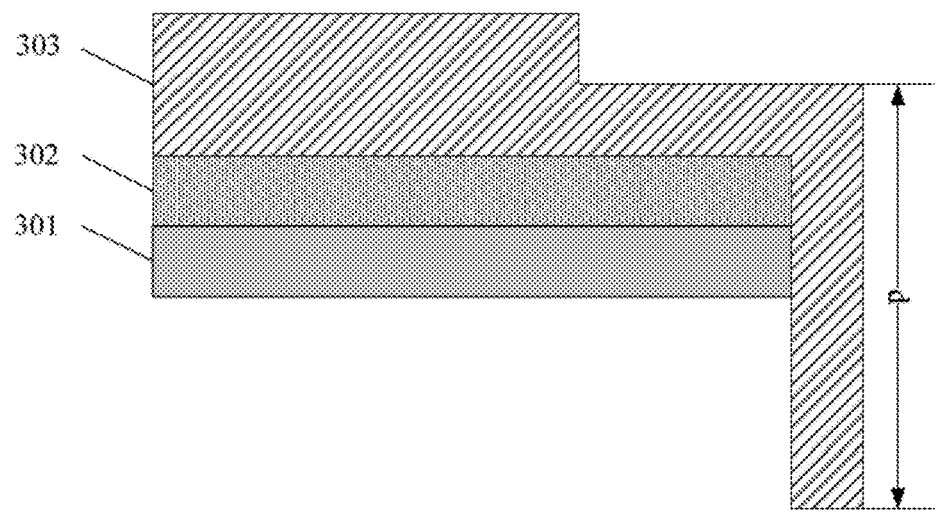
FIG. 8 shows another example of a structural diagram of a color film substrate according to an embodiment of the present disclosure.

The polarizer 303 may have a foldable structure. The polarizer 303 may be thus overturned to a GND of an array substrate side as illustrated in FIG. 8. The length d of the overturned part on the right side of polarizer 303 in FIG. 8 may depend on the thickness of the color film substrate and the thickness of a frame sealing adhesive. There may not be specific limit for the thickness.

Figure 9:
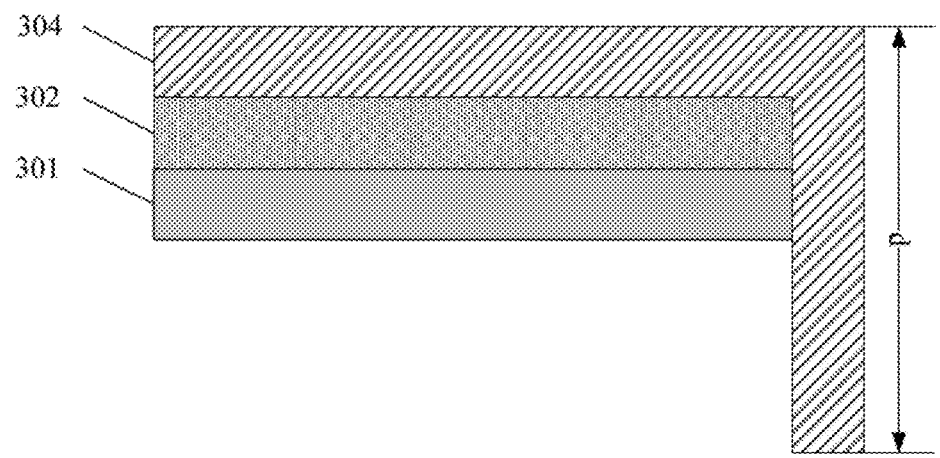
FIG. 9 shows a further example of a structural diagram of a color film substrate according to an embodiment of the present disclosure.

In addition, the color film substrate provided in the embodiment of the present disclosure may refer to FIG. 9, in which the color film layer 302 is arranged on the glass substrate 301, and the polarizer 304 is arranged on the color film layer. That is, the polarizer 304 may be directly made to be L-shaped. By setting an appropriate d value, the electrostatic charges can be conducted to the FPC GND 107 of the array substrate.

It is apparent that a person skilled in the art can make various modifications and variations to the present disclosure without departing from the spirit and scope of the present disclosure. Thus, if these modifications and variations of the present disclosure fall within the scope of the claims of the present disclosure and equivalent technologies thereof, the present disclosure is also intended to include these modifications and variations.

What is claimed is:

1. A display panel, comprising:
a first substrate comprising a ground in a periphery of the first substrate;
a counter substrate opposite to the first substrate;
a sealer between the first substrate and counter substrate defining an inside region;
a polarizer on a side of the counter substrate away from the first substrate;
wherein:
the ground is on a side of the sealer;
the polarizer is a multi-layer;
at least one of the multi-layer is a transparent conductive film layer; and
at least one of the transparent conductive film layer extends along a surface of the sealer closer to the ground to connect and contact to the ground which enables the transparent conductive film layer to conduct electroelectrostatic charges away from display panel to the ground;
wherein the polarizer comprises:
a body portion covering a surface of the counter substrate away from the first substrate;
an edge portion connected to the body portion and on an edge of the counter substrate;
a recess on a side of the edge portion away from the counter substrate;
a branch portion extending along a surface of the sealer and connected to the ground; and
a hinge portion between the edge portion and the branch portion, connecting the edge portion to the branch portion;
wherein the transparent conductive film layer is present in the body portion, the edge portion, the branch portion, and the hinge portion;
a sum of a thickness of the branch portion and a thickness of the edge portion is substantially the same as a thickness of the body portion; and
a dimension of the recess is substantially the same as a dimension of the branch portion.

2. The display panel according to claim 1, wherein the transparent conductive film layer is added with a conductive material comprising a graphene material.

3. The display panel according to claim 2, wherein all layers in the multi-layer of the polarizer extends along a surface of the sealer closer to the ground.

4. The display panel according to claim 3, wherein the graphene material is distributed in the whole polarizer.

5. The display panel according to claim 3, wherein the graphene material is distributed in a portion of the polarizer extending along the surface of the sealer closer to the ground.

6. The display panel according to claim 1, wherein the at least one of the multi-layer of the polarizer is added with a graphene material.

7. The display panel according to claim 1, wherein the polarizer comprises:
a body comprising a portion of the polarizer covering a surface of the counter substrate away from the first substrate; and
a branch integrated connected to the body, the branch comprising a portion of the polarizer extending along a surface of the sealer closer to the ground.

8. The display panel according to claim 7, wherein the branch is of a foldable structure, the foldable structure capable of removing from a location on the side of the counter substrate away from the first substrate to a location on the surface of the sealer closer to the ground.

9. The display panel according to claim 7, wherein the body and the branch form a substantially L shape.

10. The display panel according to claim 1, wherein the counter substrate is free of a separate Indium tin oxide (ITO) layer for conducting electrostatic charges away from display panel to the ground.

11. A polarizer in a display panel comprising a first substrate comprising a ground in a periphery of the first substrate, a counter substrate opposite to the first substrate and a sealer between the first substrate and counter substrate;
wherein the polarizer is a multi-layer;
at least one of the multi-layer is a transparent conductive film layer; and
at least one transparent conductive film layer extending along a surface of the sealer closer to the ground to connect and contact to the ground which enables the transparent conductive film layer to conduct electrostatic charges away from display panel to the ground;
wherein the polarizer comprises:
a body portion covering a surface of the counter substrate away from the first substrate;
an edge portion connected to the body portion and on an edge of the counter substrate;
a recess on a side of the edge portion away from the counter substrate;
a branch portion extending along a surface of the sealer and connected to the ground; and
a hinge portion between the edge portion and the branch portion, connecting the edge portion to the branch portion;
wherein the transparent conductive film layer is present in the body portion, the edge portion, the branch portion, and the hinge portion;
a sum of a thickness of the branch portion and a thickness of the edge portion is substantially the same as a thickness of the body portion; and
a dimension of the recess is substantially the same as a dimension of the branch portion.

12. The polarizer according to claim 11, wherein the transparent conductive film layer is added with a conductive material comprising a graphene material.

13. The polarizer according to claim 12, wherein the graphene material is distributed in the whole polarizer.

14. The polarizer according to claim 12, wherein the graphene material is distributed in a portion of the polarizer extending along a surface of the sealer closer to the ground.

15. The polarizer according to claim 11, wherein the polarizer comprises:
a body comprising a portion of the polarizer covering a surface of the counter substrate away from the first substrate; and
a branch connected to the body, the branch comprising a portion of the polarizer extending along a surface of the sealer closer to the ground.

16. The polarizer according to claim 15, wherein the branch is of a foldable structure, the foldable structure capable of removing from a location on the side of the counter substrate away from the first substrate to a location on the surface of the sealer closer to the ground.

17. The polarizer according to claim 15, wherein the body and the branch form a substantially L shape.

18. A color filter substrate, comprising the polarizer according to claim 11.

19. A display apparatus, comprising the display panel according to claim 1.

* * * * *